United States Patent
Hsu et al.

(10) Patent No.: US 10,427,682 B2
(45) Date of Patent: Oct. 1, 2019

(54) ADAPTIVE METHOD FOR CONTROLLING A VEHICLE SPEED AND ADAPTIVE DEVICE FOR USING THE SAME

(71) Applicant: AUTOMOTIVE RESEARCH & TESTING CENTER, Changhua County (TW)

(72) Inventors: Tsung-Ming Hsu, Changhua County (TW); Hsaing-Chieh Hsu, Changhua County (TW); Ming-Kuan Ko, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 185 days.

(21) Appl. No.: 15/838,586

(22) Filed: Dec. 12, 2017

(65) Prior Publication Data

US 2019/0176821 A1  Jun. 13, 2019

(51) Int. Cl.
*B60W 30/14* (2006.01)

(52) U.S. Cl.
CPC ....... *B60W 30/143* (2013.01); *B60W 2520/10* (2013.01); *B60W 2520/105* (2013.01); *B60W 2550/306* (2013.01)

(58) Field of Classification Search
CPC ........... B60W 30/143; B60W 2520/10; B60W 2520/105; B60W 2520/306

USPC .......................................................... 701/96
See application file for complete search history.

(56) References Cited

U.S. PATENT DOCUMENTS

| 5,532,929 A * | 7/1996 | Hattori | B60K 31/047 123/361 |
| 8,977,464 B1 * | 3/2015 | Takahashi | B60W 30/025 701/70 |
| 2008/0319628 A1 * | 12/2008 | Inou | B60W 30/143 701/93 |
| 2009/0093938 A1 * | 4/2009 | Isaji | B60W 10/184 701/96 |
| 2017/0080941 A1 * | 3/2017 | Ono | B60W 30/162 |
| 2017/0259822 A1 * | 9/2017 | Schubert | B60W 10/04 |

* cited by examiner

*Primary Examiner* — Krishnan Ramesh
(74) *Attorney, Agent, or Firm* — Rosenberg, Klein & Lee

(57) ABSTRACT

An adaptive method for controlling a vehicle speed and an adaptive device for using the same is disclosed. The method controls a vehicle speed of a host vehicle that is driving. A front vehicle drives in front of the host vehicle. There is a vehicle distance between the host vehicle and the front vehicle. Firstly, first accelerations of the host vehicle are retrieved and the vehicle speeds corresponding to the first accelerations and the vehicle distances corresponded thereof are retrieved. When all the first accelerations are not zero, the extreme values of the first accelerations are deleted. Finally, the vehicle speed of the host vehicle is controlled according to all the retrieved accelerations, their corresponding vehicle distances, and the vehicle speeds corresponded thereof.

19 Claims, 4 Drawing Sheets

ADAPTIVE METHOD FOR CONTROLLING A VEHICLE SPEED AND ADAPTIVE DEVICE FOR USING THE SAME

BACKGROUND OF THE INVENTION

Field of the Invention

The present invention relates to technology for controlling a vehicle speed, particularly to an adaptive method for controlling a vehicle speed and an adaptive device for using the same.

Description of the Related Art

An autonomous driving assistant system can use distance or image sensing devices to sense an external environment of a vehicle body so that a processor generates a control vehicle body signal according to the external environment, so as to control the state that the vehicle body moves on. As a result, the autonomous driving assistant system can assist in driving the vehicle, thereby improving driving and road safety and reducing workload for long-term driving. In the United States, the National Highway Traffic Safety Administration (NHTSA) of Department of Transportation (DOT) has proposed a formal classification system: The following pertains to automated vehicles. Level 0: No automation. Level 1: Function-specific automation. Level 2: Combined function automation. Level 3: Vehicles at this level of automation enable the driver to cede full control of all safety-critical functions under certain traffic or environmental conditions and in those conditions to rely heavily on the vehicle to monitor for changes in those conditions requiring transition back to driver control. Level 4: Full self-driving automation.

The existing autonomous driving assistant system stays at Level 2. Only one autonomous driving assistant system can control the vehicle body and installs a longitudinal-controlling autonomous assistant system or a lateral-controlling autonomous assistant system on the vehicle. The longitudinal-controlling autonomous assistant system is used to control a longitudinal acceleration, a longitudinal deceleration, a speed, a relative speed, a relative acceleration and a relative deceleration of the vehicle body. For example, an autonomous emergency braking system (AEB) uses precise sensor and electrical equipment to determine whether there are objects in front of the vehicle. If the system determines that a collision possibly occurs, the system automatically makes a quick stop. Besides, as shown in FIG. 1, an adaptive cruise control (ACC) system 10 uses a sensor 12 to continuously detect a road in front of a host vehicle, thereby retrieving the speed and the relative distance of a front vehicle. When a distance between the front vehicle and the host vehicle is shorter and shorter, a processor 14 and a longitudinal-controlling autonomous assistant device 16 of the ACC system 10 correspondingly control the vehicle speed of the host vehicle according to preset parameters, such that the distance between the host vehicle and the front vehicle is fixed. When the front vehicle leaves the front of the host vehicle, the processor 14 and the longitudinal-controlling autonomous assistant device 16 of the ACC system 10 automatically accelerates the host vehicle, whereby the driver feels safer and more comfortable. However, the existing autonomous assistant driving system cannot automatically adjust the vehicle speed and the relative distance according to different driving habits. Thus, the driver inconveniently drives the vehicle using the existing autonomous assistant driving system.

To overcome the abovementioned problems, the present invention provides an adaptive method for controlling a vehicle speed and an adaptive device for using the same, so as to solve the afore-mentioned problems of the prior art.

SUMMARY OF THE INVENTION

A primary objective of the present invention is to provide an adaptive method for controlling a vehicle speed and an adaptive device for using the same, which continuously learns different driving habits of drivers on line to establish an adaptive model and uses the adaptive model to automatically adjust the vehicle speed and the relative vehicle distance, such that the driver feels more comfortable.

To achieve the abovementioned objectives, the present invention provides an adaptive method for controlling a vehicle speed, which controls the vehicle speed of a host vehicle that is driving. A front vehicle drives in front of the host vehicle. There is a vehicle distance between the host vehicle and the front vehicle. Firstly, in Step (a), setting an upper-limited acceleration as well as a lower-limited acceleration in which the upper limited acceleration is larger than the lower limited acceleration, and setting the vehicle speeds corresponding to the upper-limited acceleration as well as the lower-limited acceleration, and the vehicle distances corresponded thereof. Then, in Step (b), continuously retrieving a plurality of first accelerations of the host vehicle within a first period and retrieving the vehicle speeds corresponding to the plurality of first accelerations and the vehicle distances corresponded thereof. Then, in Step (c), determining whether the plurality of first accelerations are zero within the first period: if no, dividing the plurality of first accelerations into a first high part, a first middle part, and a first low part in which the first acceleration of the first middle part is less than the first acceleration of the first high part and larger than the first acceleration of the first low part; and if yes, ending. Then, in Step (d), determining whether the highest first acceleration of the first middle part is larger than the upper-limited acceleration and determining whether the lowest first acceleration of the first middle part is less than the low-limited acceleration. When the highest first acceleration of the first middle part is not larger than the upper-limited acceleration and the lowest first acceleration of the first middle part is not less than the low-limited acceleration, replacing the highest first acceleration with the upper-limited acceleration, replacing the lowest first acceleration with the low-limited acceleration, and executing Step (e). When the highest first acceleration of the first middle part is larger than the upper-limited acceleration and the lowest first acceleration of the first middle part is not less than the low-limited acceleration, replacing the lowest first acceleration with the low-limited acceleration and executing Step (e). When the highest first acceleration of the first middle part is not larger than the upper-limited acceleration and the lowest first acceleration of the first middle part is less than the low-limited acceleration, replacing the highest first acceleration with the upper-limited acceleration and executing Step (e). When the highest first acceleration of the first middle part is larger than the upper-limited acceleration and the lowest first acceleration of the first middle part is less than the low-limited acceleration, executing Step (e). Finally, in Step (e), controlling the vehicle speed of the host vehicle according to all the accelerations of the first middle part, their corresponding vehicle speeds and the vehicle distances corresponded thereof.

In an embodiment of the present invention, Steps (f), (g), (h), (i), and (j) are sequentially executed after Step (e). In Step (f), continuously retrieving a plurality of second accelerations of the host vehicle within a second period and retrieving the vehicle speeds corresponding to the plurality of second accelerations and the vehicle distances corresponded thereof. In Step (g), determining whether the plurality of second accelerations are zero within the second period: if no, dividing the plurality of second accelerations into a second high part, a second middle part, and a second low part in which the second acceleration of the second middle part is less than the second acceleration of the second high part and larger than the second acceleration of the second low part; and if yes, ending. In Step (h), determining whether the highest second acceleration of the second middle part is larger than the highest acceleration of the next-preceding middle part and determining whether the lowest second acceleration of the second middle part is less than the lowest acceleration of the next-preceding middle part. When the highest second acceleration of the second middle part is not larger than the highest acceleration of the next-preceding middle part and the lowest second acceleration of the second middle part is not less than the lowest acceleration of the next-preceding middle part, replacing the highest second acceleration with the highest acceleration of the next-preceding middle part, replacing the lowest second acceleration with the lowest acceleration of the next-preceding middle part, and executing Step (i). When the highest second acceleration of the second middle part is larger than the highest acceleration of the next-preceding middle part and the lowest second acceleration of the second middle part is not less than the lowest acceleration of the next-preceding middle part, replacing the lowest second acceleration with the lowest acceleration of the next-preceding middle part and executing Step (i). When the highest second acceleration of the second middle part is not larger than the highest acceleration of the next-preceding middle part and the lowest second acceleration of the second middle part is less than the lowest acceleration of the next-preceding middle part, replacing the highest second acceleration with the highest acceleration of the next-preceding middle part and executing Step (i). When the highest second acceleration of the second middle part is larger than the highest acceleration of the next-preceding middle part and the lowest second acceleration of the second middle part is less than the lowest acceleration of the next-preceding middle part, executing Step (i). In Step (i), controlling the vehicle speed of the host vehicle according to all the accelerations of the second middle part, their corresponding vehicle speeds and the vehicle distances corresponded thereof. In Step (j), returning to Step (f).

In an embodiment of the present invention, the upper-limited acceleration, the lower-limited acceleration, the first accelerations, and the second accelerations are positive values or negative values.

In an embodiment of the present invention, when the front vehicle leaves the front of the host vehicle, the vehicle distance is infinite.

The present invention also provides an adaptive device for controlling a vehicle speed, which controls the vehicle speed of a host vehicle that is driving. A front vehicle drives in front of the host vehicle. There is a vehicle distance between the host vehicle and the front vehicle, the adaptive device comprises a storage storing an upper-limited acceleration as well as a lower-limited acceleration in which the upper-limited acceleration is larger than the lower-limited acceleration and storing the vehicle speeds corresponding to the upper-limited acceleration as well as the lower-limited acceleration, and the vehicle distances corresponded thereof; a parameter retriever continuously retrieving a plurality of first accelerations of the host vehicle within a first period, retrieving the vehicle speeds corresponding to the plurality of first accelerations and the vehicle distances corresponded thereof, and outputting the plurality of first accelerations, their corresponding vehicle speeds, and the vehicle distances corresponded thereof; and a controller electrically connected to the storage as well as the parameter retriever, and receiving the plurality of first accelerations, their corresponding vehicle speeds, and the vehicle distances corresponded thereof. When the plurality of first accelerations are not zero within the first period, the controller divides the plurality of first accelerations into a first high part, a first middle part, and a first low part in which the first acceleration of the first middle part is less than the first acceleration of the first high part and larger than the first acceleration of the first low part. When the highest first acceleration of the first middle part is not larger than the upper-limited acceleration, the controller replaces the highest first acceleration with the upper-limited acceleration. When the lowest first acceleration of the first middle part is not less than the low-limited acceleration, the controller replaces the lowest first acceleration with the low-limited acceleration. The controller controls the vehicle speed of the host vehicle according to all the accelerations of the first middle part, their corresponding vehicle speeds and the vehicle distances corresponded thereof.

In an embodiment of the present invention, the parameter retriever continuously retrieves a plurality of second accelerations of the host vehicle within a second period and retrieves the vehicle speeds corresponding to the plurality of second accelerations and the vehicle distances corresponded thereof, and the controller receives the plurality of second accelerations, their corresponding vehicle speeds, and the vehicle distances corresponded thereof. When the plurality of second accelerations are not zero within the second period, the controller divides the plurality of second accelerations into a second high part, a second middle part, and a second low part in which the second acceleration of the second middle part is less than the second acceleration of the second high part and larger than the second acceleration of the second low part. When the highest second acceleration of the second middle part is not larger than the highest acceleration of the first middle part, the controller replaces the highest second acceleration with the highest acceleration of the first middle part. When the lowest second acceleration of the second middle part is not less than the lowest acceleration of the first middle part, the controller replaces the lowest second acceleration with the lowest acceleration of the first middle part. The controller controls the vehicle speed of the host vehicle according to all the accelerations of the second middle part, their corresponding vehicle speeds and the vehicle distances corresponded thereof.

In an embodiment of the present invention, the upper-limited acceleration, the lower-limited acceleration, the first accelerations, and the second accelerations are positive values or negative values.

In an embodiment of the present invention, the parameter retriever further comprises a speed sensor electrically connected to the controller, retrieving the vehicle speeds within the first period and the second period, and outputting them; a ranging sensor electrically connected to the controller, retrieving the vehicle distances within the first period and the second period, and outputting them; and an acceleration calculator electrically connected to the speed sensor, the ranging sensor, and the controller, receiving the vehicle speeds and the vehicle distances within the first period and the second period, calculating the plurality of first accelerations according to the vehicle speeds as well as the vehicle distances within the first period, and calculating the plurality of second accelerations according to the vehicle speeds and the vehicle distances within the second period.

In an embodiment of the present invention, when the front vehicle leaves the front of the host vehicle, the vehicle distance is infinite.

Below, the embodiments are described in detail in cooperation with the drawings to make easily understood the technical contents, characteristics and accomplishments of the present invention.

DETAILED DESCRIPTION OF THE INVENTION

Figure 1:
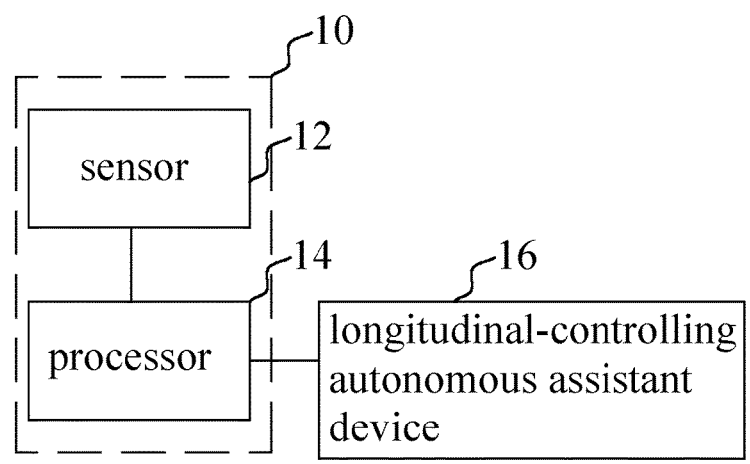
FIG. 1 is a block diagram showing an adaptive cruise control (ACC) system and a longitudinal-controlling autonomous assistant device in the conventional technology.
Figure 2:
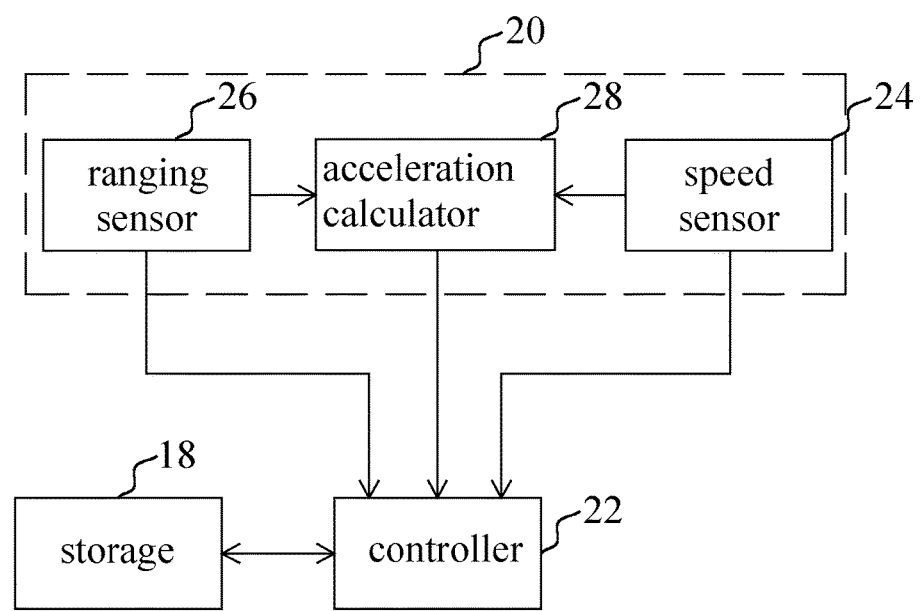
FIG. 2 is a block diagram showing an adaptive device for controlling a vehicle speed according to an embodiment of the present invention.

Refer to FIG. 2. The adaptive device for controlling a vehicle speed is introduced as follows. The adaptive device is installed in a host vehicle that is driving to control the vehicle speed of the host vehicle. A front vehicle drives in front of the host vehicle. There is a distance between the front vehicle and the host vehicle. When the front vehicle leaves the front of the host vehicle, the vehicle distance is infinite. The adaptive device for controlling the vehicle speed comprises a storage 18, a parameter retriever 20, and a controller 22. The storage 18 stores an upper-limited acceleration as well as a lower-limited acceleration of the host vehicle in which the upper-limited acceleration is larger than the lower-limited acceleration and stores the vehicle speeds of the host vehicle corresponding to the upper-limited acceleration as well as the lower-limited acceleration and the vehicle distances corresponded thereof. The upper-limited acceleration and the lower-limited acceleration, the vehicle speeds of the host vehicle corresponding to the upper-limited acceleration and the lower-limited acceleration, and the vehicle distances corresponded thereof are preset values of an original industry. The parameter retriever 20 continuously retrieves a plurality of first accelerations of the host vehicle within a first period, retrieves the vehicle speeds corresponding to the plurality of first accelerations and the vehicle distances corresponded thereof, and outputs the plurality of first accelerations, their corresponding vehicle speeds, and the vehicle distances corresponded thereof. The upper-limited acceleration, the lower-limited acceleration, and the first accelerations are positive values or negative values. The controller 22 is electrically connected to the storage 18 as well as the parameter retriever 20, and receives the plurality of first accelerations, their corresponding vehicle speeds, and the vehicle distances corresponded thereof to establish an online adaptive model. For example, the first accelerations respectively retrieved at neighboring first time points, and the first time points are spaced at first fixed intervals, and the first fixed interval is 0.1 second or 0.01 second. When the plurality of first accelerations are not zero within the first period, the controller divides the plurality of first accelerations into a first high part, a first middle part, and a first low part in which the first acceleration of the first middle part is less than the first acceleration of the first high part and larger than the first acceleration of the first low part. For example, the ratio of the number of the first accelerations of the first high part to the number of all the first accelerations is 20%, and the ratio of the number of the first accelerations of the first low part to the number of all the first accelerations is 20%. When the highest first acceleration of the first middle part is not larger than the upper-limited acceleration, the controller replaces the highest first acceleration with the upper-limited acceleration. When the lowest first acceleration of the first middle part is not less than the low-limited acceleration, the controller replaces the lowest first acceleration with the low-limited acceleration. The controller 22 learns the driving habit of a driver on line to establish an online adaptive model in the abovementioned way. Then, the controller 22 controls the vehicle speed of the host vehicle according to all the accelerations of the first middle part, their corresponding vehicle speeds and the vehicle distances corresponded thereof. When the driver drives the host vehicle, the extreme values of the vehicle speeds that the driver does not want sometimes appear. Thus, the present invention chooses the first accelerations of the middle part to compare, such that the host vehicle learns the driving habit of the driver to adjust the vehicle speed and the relative vehicle distance. Accordingly, the driver feels more comfortable.

When the driver proceeds to change the vehicle speed of the host vehicle, the parameter retriever 20 continuously retrieves a plurality of second accelerations of the host vehicle within a second period and retrieves the vehicle speeds corresponding to the plurality of second accelerations and the vehicle distances corresponded thereof. The second accelerations are positive values or negative values. For example, the second accelerations respectively retrieved at neighboring second time points, and the second time points are spaced at second fixed intervals, and the second fixed interval is 0.1 second or 0.01 second. The controller 22 receives the plurality of second accelerations, their corresponding vehicle speeds, and the vehicle distances corresponded thereof, so as to establish a new online adaptive model. When the plurality of second accelerations are not zero within the second period, the controller 22 divides the plurality of second accelerations into a second high part, a second middle part, and a second low part in which the second acceleration of the second middle part is less than the second acceleration of the second high part and larger than the second acceleration of the second low part. For example, the ratio of the number of the second accelerations of the second high part to the number of all the second accelerations is 20%, and the ratio of the number of the second accelerations of the second low part to the number of all the second accelerations is 20%. When the highest second acceleration of the second middle part is not larger than the highest acceleration of the first middle part, the controller 22 replaces the highest second acceleration with the highest acceleration of the first middle part. When the lowest second acceleration of the second middle part is not less than the lowest acceleration of the first middle part, the controller 22 replaces the lowest second acceleration with the lowest acceleration of the first middle part. The controller 22 learns the new driving habit of the driver on line to establish a new online adaptive model in the abovementioned way. Then, the controller 22 controls the vehicle speed of the host vehicle according to all the accelerations of the second middle part, their corresponding vehicle speeds and the vehicle distances corresponded thereof.

The parameter retriever 20 further comprises a speed sensor 24, a ranging sensor 26, and an acceleration calculator 28. For example, the speed sensor 24 is a wheel speed sensor, and the ranging sensor 26 is a radar or a lidar. The speed sensor 24 is electrically connected to the controller 22, retrieves the vehicle speeds within the first period and the second period, and outputs them. The ranging sensor 26 is electrically connected to the controller 22, retrieves the vehicle distances within the first period and the second period, and outputs them. The acceleration calculator 28 is electrically connected to the speed sensor 24, the ranging sensor 26, and the controller 22, receives the vehicle speeds and the vehicle distances within the first period and the second period, calculates the plurality of first accelerations according to the vehicle speeds as well as the vehicle distances within the first period, calculates the plurality of second accelerations according to the vehicle speeds and the vehicle distances within the second period, and outputs the plurality of first accelerations within the first period and the plurality of second accelerations within the second period. As a result, the first acceleration is a function of the vehicle speed and the vehicle distance, and the second acceleration is also a function of the vehicle speed and the vehicle distance.

Figure 3:
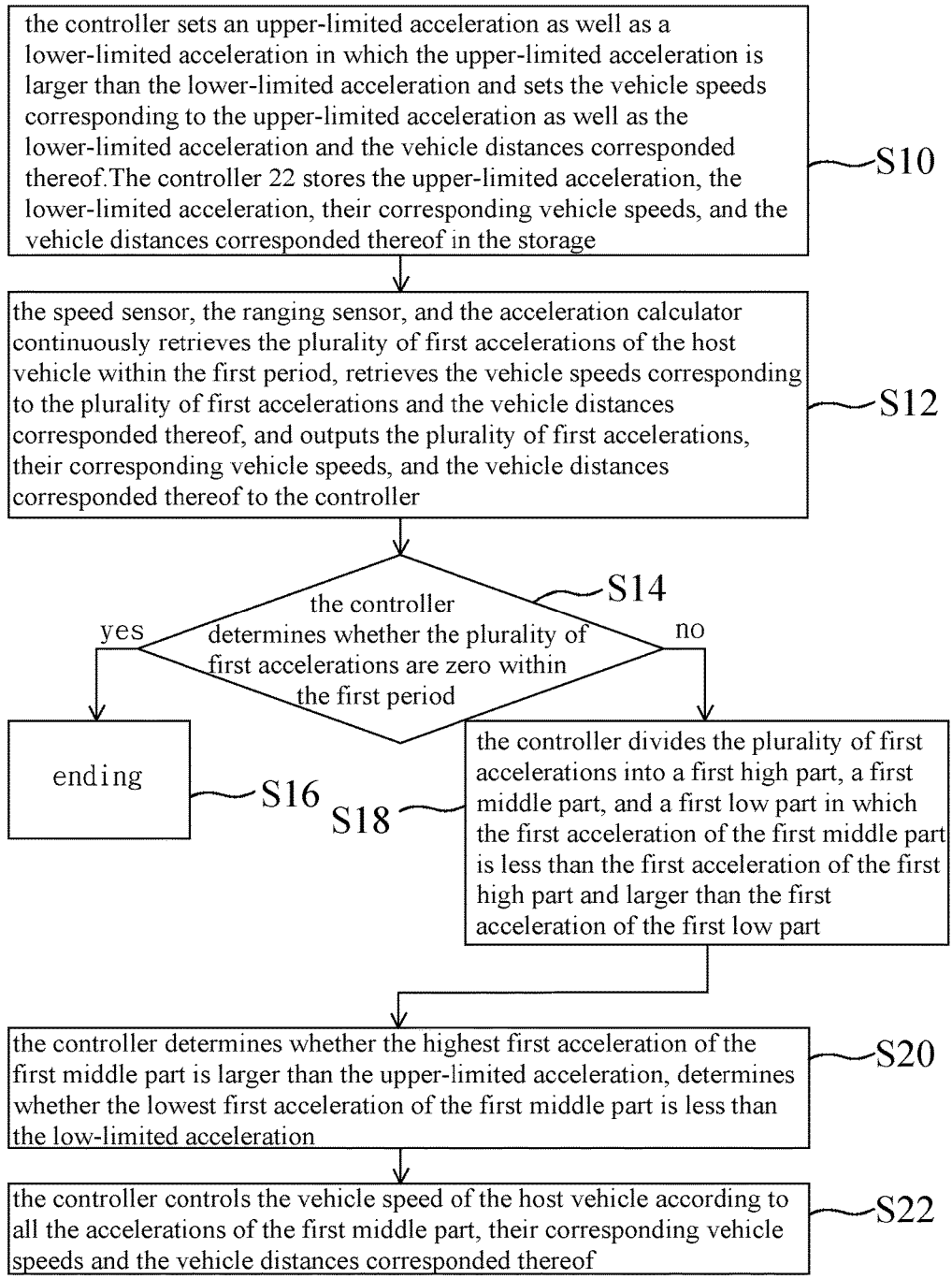
FIG. 3 is a flowchart of related steps of the first acceleration of an adaptive method for controlling a vehicle speed according to an embodiment of the present invention.

The adaptive method for controlling a vehicle speed of the present invention is introduced as follows. Refer to FIG. 2 and FIG. 3. Firstly, in Step S10, the controller 22 sets an upper-limited acceleration as well as a lower-limited acceleration in which the upper-limited acceleration is larger than the lower-limited acceleration and sets the vehicle speeds corresponding to the upper-limited acceleration as well as the lower-limited acceleration and the vehicle distances corresponded thereof. The controller 22 stores the upper-limited acceleration, the lower-limited acceleration, their corresponding vehicle speeds, and the vehicle distances corresponded thereof in the storage 18. Then, the controller 22 chooses an original industry mode or a user mode. If the original industry mode is chosen, the controller 22 controls the host vehicle in the original industry mode. If the user mode is chosen, the process proceeds to Step S12. In Step S12, the speed sensor 24, the ranging sensor 26, and the acceleration calculator 28 continuously retrieves the plurality of first accelerations of the host vehicle within the first period, retrieves the vehicle speeds corresponding to the plurality of first accelerations and the vehicle distances corresponded thereof, and outputs the plurality of first accelerations, their corresponding vehicle speeds, and the vehicle distances corresponded thereof to the controller 22. Then, in Step S14, the controller 22 determines whether the plurality of first accelerations are zero within the first period. If the answer is yes, the process proceeds to Step S16. If the answer is no, the process proceeds to Step S18. In Step S16, the process is ended. In Step S18, the controller 22 divides the plurality of first accelerations into a first high part, a first middle part, and a first low part in which the first acceleration of the first middle part is less than the first acceleration of the first high part and larger than the first acceleration of the first low part. After Step S18, the process proceeds to Step S20. In Step S20, the controller 22 determines whether the highest first acceleration of the first middle part is larger than the upper-limited acceleration, determines whether the lowest first acceleration of the first middle part is less than the low-limited acceleration, and executes the next-following step according to a determination result. When the highest first acceleration of the first middle part is not larger than the upper-limited acceleration and the lowest first acceleration of the first middle part is not less than the low-limited acceleration, the controller 22 replaces the highest first acceleration with the upper-limited acceleration and replaces the lowest first acceleration with the low-limited acceleration, and the process proceeds to Step 22. When the highest first acceleration of the first middle part is larger than the upper-limited acceleration and the lowest first acceleration of the first middle part is not less than the low-limited acceleration, the controller 22 replaces the lowest first acceleration with the low-limited acceleration and the process proceeds to Step 22. When the highest first acceleration of the first middle part is not larger than the upper-limited acceleration and the lowest first acceleration of the first middle part is less than the low-limited acceleration, the controller 22 replaces the highest first acceleration with the upper-limited acceleration and the process proceeds to Step 22. When the highest first acceleration of the first middle part is larger than the upper-limited acceleration and the lowest first acceleration of the first middle part is less than the low-limited acceleration, the process proceeds to Step 22. In Step S22, the controller 22 controls the vehicle speed of the host vehicle according to all the accelerations of the first middle part, their corresponding vehicle speeds and the vehicle distances corresponded thereof.

Figure 4:
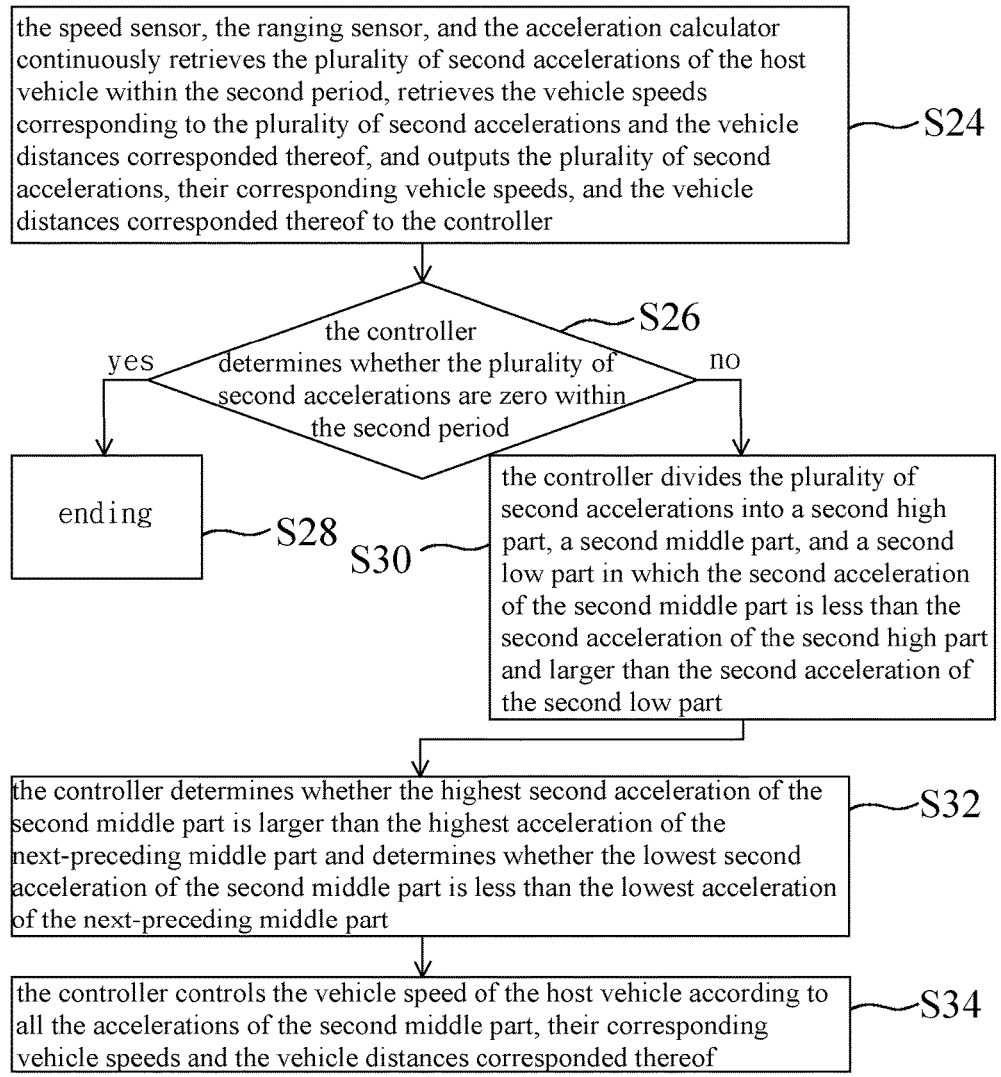
FIG. 4 is a flowchart of related steps of the second acceleration of an adaptive method for controlling a vehicle speed according to an embodiment of the present invention.

After Step S22, the flowchart of FIG. 4 is performed. Refer to FIG. 2 and FIG. 4. After Step S22, the process proceeds to Step S24. In Step S24, the speed sensor 24, the ranging sensor 26, and the acceleration calculator 28 continuously retrieves the plurality of second accelerations of the host vehicle within the second period, retrieves the vehicle speeds corresponding to the plurality of second accelerations and the vehicle distances corresponded thereof, and outputs the plurality of second accelerations, their corresponding vehicle speeds, and vehicle distances corresponded thereof to the controller 22 Then, in Step S26, the controller 22 determines whether the plurality of second accelerations are zero within the second period. If the answer is yes, the process proceeds to Step S28. If the answer is no, the process proceeds to Step S30. In Step S28, the process is ended. In Step S30, the controller 22 divides the plurality of second accelerations into a second high part, a second middle part, and a second low part in which the second acceleration of the second middle part is less than the second acceleration of the second high part and larger than the second acceleration of the second low part. After Step S30, the process proceeds to Step S32. In Step S32, the controller 22 determines whether the highest second acceleration of the second middle part is larger than the highest acceleration of the next-preceding middle part and determines whether the lowest second acceleration of the second middle part is less than the lowest acceleration of the next-preceding middle part, and the process proceeds to the next-following step according to a determination result. When the process proceeds to Step S32 for the first time, the next-preceding middle part is the first middle part. When the highest second acceleration of the second middle part is not larger than the highest acceleration of the next-preceding middle part and the lowest second acceleration of the second middle part is not less than the lowest acceleration of the next-preceding middle part, the controller 22 replaces the highest second acceleration with the highest acceleration of the next-preceding middle part and replaces the lowest second acceleration with the lowest acceleration of the next-preceding middle part, and the process proceeds to Step S34. When the highest second acceleration of the second middle part is larger than the highest acceleration of the next-preceding middle part and the lowest second acceleration of the second middle part is not less than the lowest acceleration of the next-preceding middle part, the controller 22 replaces the lowest second acceleration with the lowest acceleration of the next-preceding middle part and the process proceeds to Step S34. When the highest second acceleration of the second middle part is not larger than the highest acceleration of the next-preceding middle part and the lowest second acceleration of the second middle part is less than the lowest acceleration of the next-preceding middle part, the controller 22 replaces the highest second acceleration with the highest acceleration of the next-preceding middle part and the process proceeds to Step S34. When the highest second acceleration of the second middle part is larger than the highest acceleration of the next-preceding middle part and the lowest second acceleration of the second middle part is less than the lowest acceleration of the next-preceding middle part, the process proceeds to Step S34. In Step S34, the controller 22 controls the vehicle speed of the host vehicle according to all the accelerations of the second middle part, their corresponding vehicle speeds and the vehicle distances corresponded thereof.

The adaptive method for controlling the vehicle speed of the present invention may execute Steps S10-S22 or Steps S10-S34. Besides, after Step S34, the process proceeds to Steps S24-S34 again. When the driving habit of the driver is learned, the maximum value of the acceleration is higher and higher and the minimum value of the acceleration is lower and lower. In order to avoid violating traffic regulations, the present invention presets the maximum acceleration value and the minimum acceleration value. The upper-limited acceleration, the lower-limited acceleration, the first accelerations, and the second accelerations are not higher than the maximum acceleration value. The upper-limited acceleration, the lower-limited acceleration, the first accelerations, and the second accelerations are not lower than the minimum acceleration value. On top of that, the present invention also uses the face recognizing technology or the fingerprint recognizing technology to determine the identification of a driver, so as to learn the driving habits of different drivers.

In conclusion, the present invention automatically adjusts the vehicle speed and the relative vehicle distance according to the driving habits of different drivers, such that the drivers feel more comfortable.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An adaptive method for controlling a vehicle speed, which controls a vehicle speed of a host vehicle that is driving, a front vehicle drives in front of the host vehicle, there is a vehicle distance between the host vehicle and the front vehicle, the adaptive method comprising:
    (a) setting an upper-limited acceleration as well as a lower-limited acceleration in which the upper limited acceleration is larger than the lower limited acceleration, and setting the vehicle speeds corresponding to the upper-limited acceleration as well as the lower-limited acceleration and the vehicle distances corresponded thereof;
    (b) continuously retrieving a plurality of first accelerations of the host vehicle within a first period and retrieving the vehicle speeds corresponding to the plurality of first accelerations and the vehicle distances corresponded thereof;
    (c) determining whether the plurality of first accelerations are zero within the first period:
        if no, dividing the plurality of first accelerations into a first high part, a first middle part, and a first low part in which the first acceleration of the first middle part is less than the first acceleration of the first high part and larger than the first acceleration of the first low part; and
        if yes, ending;
    (d) determining whether highest the first acceleration of the first middle part is larger than the upper-limited acceleration and determining whether lowest the first acceleration of the first middle part is less than the low-limited acceleration:
        when the highest the first acceleration of the first middle part is not larger than the upper-limited acceleration and the lowest the first acceleration of the first middle part is not less than the low-limited acceleration, replacing the highest the first acceleration with the upper-limited acceleration, replacing the lowest the first acceleration with the low-limited acceleration, and executing operation (e);
        when the highest the first acceleration of the first middle part is larger than the upper-limited acceleration and the lowest the first acceleration of the first middle part is not less than the low-limited acceleration, replacing the lowest the first acceleration with the low-limited acceleration and executing operation (e);
        when the highest the first acceleration of the first middle part is not larger than the upper-limited acceleration and the lowest the first acceleration of the first middle part is less than the low-limited acceleration, replacing the highest the first acceleration with the upper-limited acceleration and executing operation (e); and
        when the highest the first acceleration of the first middle part is larger than the upper-limited acceleration and the lowest the first acceleration of the first middle part is less than the low-limited acceleration, executing operation (e); and
    (e) controlling the vehicle speed of the host vehicle according to all the accelerations of the first middle part, their corresponding the vehicle speeds and the vehicle distances corresponded thereof.

2. The adaptive method for controlling the vehicle speed according to claim 1, wherein the first accelerations respectively retrieved at neighboring first time points, and the first time points are spaced at first fixed intervals, and the first fixed interval is 0.1 second or 0.01 second.

3. The adaptive method for controlling the vehicle speed according to claim 1, wherein a ratio of number of the first accelerations of the first high part to number of all the first accelerations is 20%, and a ratio of number of the first accelerations of the first low part to number of all the first accelerations is 20%.

4. The adaptive method for controlling the vehicle speed according to claim 1, further comprising:
    (f) continuously retrieving a plurality of second accelerations of the host vehicle within a second period and retrieving the vehicle speeds corresponding to the plurality of second accelerations and the vehicle distances corresponded thereof;

(g) determining whether the plurality of second accelerations are zero within the second period:
if no, dividing the plurality of second accelerations into a second high part, a second middle part, and a second low part in which the second acceleration of the second middle part is less than the second acceleration of the second high part and larger than the second acceleration of the second low part; and
if yes, ending;

(h) determining whether highest the second acceleration of the second middle part is larger than highest the acceleration of the next-preceding middle part and determining whether lowest the second acceleration of the second middle part is less than lowest the acceleration of the next-preceding middle part:
when the highest the second acceleration of the second middle part is not larger than the highest the acceleration of the next-preceding middle part and the lowest the second acceleration of the second middle part is not less than the lowest the acceleration of the next-preceding middle part, replacing the highest the second acceleration with the highest the acceleration of the next-preceding middle part, replacing the lowest the second acceleration with the lowest the acceleration of the next-preceding middle part, and executing operation (i);
when the highest the second acceleration of the second middle part is larger than the highest the acceleration of the next-preceding middle part and the lowest the second acceleration of the second middle part is not less than the lowest the acceleration of the next-preceding middle part, replacing the lowest the second acceleration with the lowest the acceleration of the next-preceding middle part and executing operation (i);
when the highest the second acceleration of the second middle part is not larger than the highest the acceleration of the next-preceding middle part and the lowest the second acceleration of the second middle part is less than the lowest the acceleration of the next-preceding middle part, replacing the highest the second acceleration with the highest the acceleration of the next-preceding middle part and executing operation (i);
when the highest the second acceleration of the second middle part is larger than the highest the acceleration of the next-preceding middle part and the lowest the second acceleration of the second middle part is less than the lowest the acceleration of the next-preceding middle part, executing operation (i);

(i) controlling the vehicle speed of the host vehicle according to all the accelerations of the second middle part, their corresponding the vehicle speeds and the vehicle distances corresponded thereof; and (j) returning to operation (f).

5. The adaptive method for controlling the vehicle speed according to claim 4, wherein the upper-limited acceleration, the lower-limited acceleration, the first accelerations, and the second accelerations are positive values or negative values.

6. The adaptive method for controlling the vehicle speed according to claim 4, wherein the second accelerations respectively retrieved at neighboring second time points, and the second time points are spaced at second fixed intervals, and the second fixed interval is 0.1 second or 0.01 second.

7. The adaptive method for controlling the vehicle speed according to claim 4, wherein a ratio of number of the second accelerations of the second high part to number of all the second accelerations is 20%, and a ratio of number of the second accelerations of the second low part to number of all the second accelerations is 20%.

8. The adaptive method for controlling the vehicle speed according to claim 1, wherein when the front vehicle leaves a front of the host vehicle, the vehicle distance is infinite.

9. An adaptive device for controlling a vehicle speed, which controls a vehicle speed of a host vehicle that is driving, a front vehicle drives in front of the host vehicle, there is a vehicle distance between the host vehicle and the front vehicle, the adaptive device comprising:
a storage storing an upper-limited acceleration as well as a lower-limited acceleration in which the upper-limited acceleration is larger than the lower-limited acceleration and storing the vehicle speeds corresponding to the upper-limited acceleration as well as the lower-limited acceleration and the vehicle distances corresponded thereof;
a parameter retriever continuously retrieving a plurality of first accelerations of the host vehicle within a first period, retrieving the vehicle speeds corresponding to the plurality of first accelerations and the vehicle distances corresponded thereof, and outputting the plurality of first accelerations, their corresponding the vehicle speeds, and the vehicle distances corresponded thereof; and
a controller electrically connected to the storage as well as the parameter retriever, and receiving the plurality of first accelerations, their corresponding the vehicle speeds, and the vehicle distances corresponded thereof, and when the plurality of first accelerations are not zero within the first period, the controller divides the plurality of first accelerations into a first high part, a first middle part, and a first low part in which the first acceleration of the first middle part is less than the first acceleration of the first high part and larger than the first acceleration of the first low part, and when highest the first acceleration of the first middle part is not larger than the upper-limited acceleration, the controller replaces the highest the first acceleration with the upper-limited acceleration, and when lowest the first acceleration of the first middle part is not less than the low-limited acceleration, the controller replaces the lowest the first acceleration with the low-limited acceleration, and the controller controls the vehicle speed of the host vehicle according to all the accelerations of the first middle part, their corresponding the vehicle speeds and the vehicle distances corresponded thereof.

10. The adaptive device for controlling the vehicle speed according to claim 9, wherein the first accelerations respectively retrieved at neighboring first time points, and the first time points are spaced at first fixed intervals, and the first fixed interval is 0.1 second or 0.01 second.

11. The adaptive device for controlling the vehicle speed according to claim 9, wherein a ratio of number of the first accelerations of the first high part to number of all the first accelerations is 20%, and a ratio of number of the first accelerations of the first low part to number of all the first accelerations is 20%.

12. The adaptive device for controlling the vehicle speed according to claim 9, wherein the parameter retriever continuously retrieves a plurality of second accelerations of the host vehicle within a second period and retrieves the vehicle speeds corresponding to the plurality of second accelerations and the vehicle distances corresponded thereof, and the controller receives the plurality of second accelerations, their corresponding the vehicle speeds, and the vehicle distances corresponded thereof, and when the plurality of second accelerations are not zero within the second period, the controller divides the plurality of second accelerations into a second high part, a second middle part, and a second low part in which the second acceleration of the second middle part is less than the second acceleration of the second high part and larger than the second acceleration of the second low part, and when highest the second acceleration of the second middle part is not larger than the highest the acceleration of the first middle part, the controller replaces the highest the second acceleration with the highest the acceleration of the first middle part, and when lowest the second acceleration of the second middle part is not less than the lowest the acceleration of the first middle part, the controller replaces the lowest the second acceleration with the lowest the acceleration of the first middle part, and the controller controls the vehicle speed of the host vehicle according to all the accelerations of the second middle part, their corresponding the vehicle speeds and the vehicle distances corresponded thereof.

13. The adaptive device for controlling the vehicle speed according to claim 12, wherein the upper-limited acceleration, the lower-limited acceleration, the first accelerations, and the second accelerations are positive values or negative values.

14. The adaptive device for controlling the vehicle speed according to claim 12, wherein the parameter retriever further comprises:
   a speed sensor electrically connected to the controller, retrieving the vehicle speeds within the first period and the second period, and outputting them;
   a ranging sensor electrically connected to the controller, retrieving the vehicle distances within the first period and the second period, and outputting them; and
   an acceleration calculator electrically connected to the speed sensor, the ranging sensor, and the controller, receiving the vehicle speeds and the vehicle distances within the first period and the second period, calculating the plurality of first accelerations according to the vehicle speeds as well as the vehicle distances within the first period, and calculating the plurality of second accelerations according to the vehicle speeds and the vehicle distances within the second period.

15. The adaptive device for controlling the vehicle speed according to claim 14, wherein the speed sensor is a wheel speed sensor.

16. The adaptive device for controlling the vehicle speed according to claim 14, wherein the ranging sensor is a radar and a lidar.

17. The adaptive device for controlling the vehicle speed according to claim 12, wherein the second accelerations respectively retrieved at neighboring second time points, and the second time points are spaced at second fixed intervals, and the second fixed interval is 0.1 second or 0.01 second.

18. The adaptive device for controlling the vehicle speed according to claim 12, wherein a ratio of number of the second accelerations of the second high part to number of all the second accelerations is 20%, and a ratio of number of the second accelerations of the second low part to number of all the second accelerations is 20%.

19. The adaptive device for controlling the vehicle speed according to claim 9, wherein when the front vehicle leaves a front of the host vehicle, the vehicle distance is infinite.

* * * * *